THOMAS J. MAYALL.
Improvement in Machine for Cutting India Rubber Sheets into Bands for Hose and Belting.
No. 125,597.  Patented April 9, 1872.
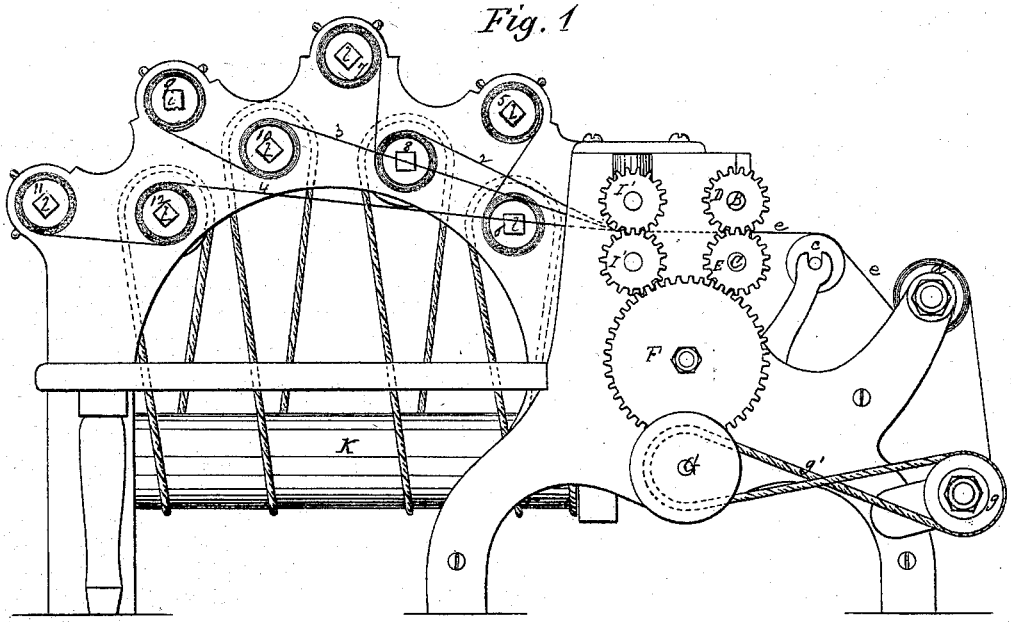
Fig. 1
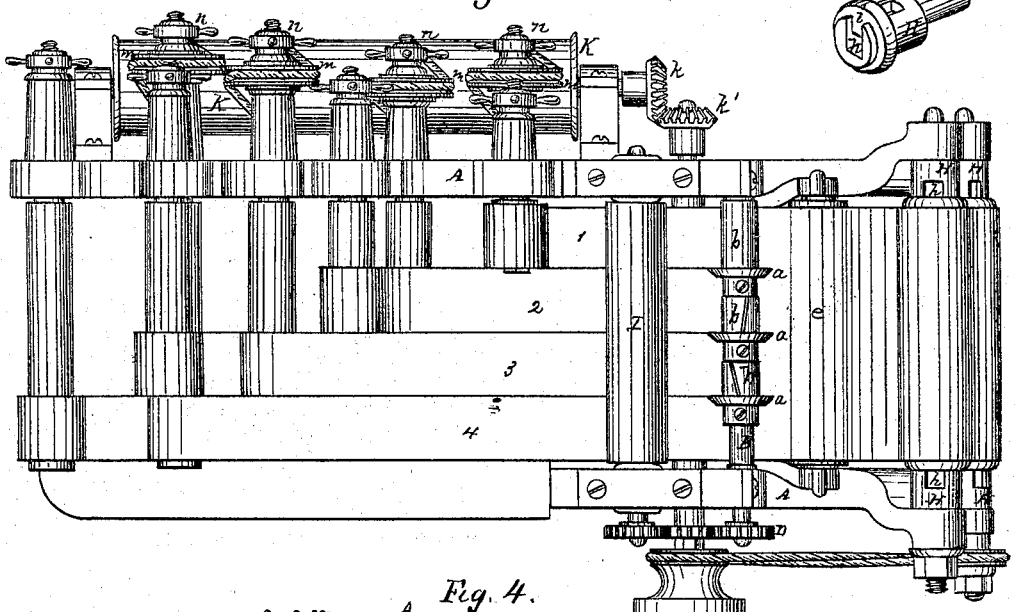
Fig. 2.
Fig. 3
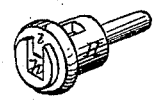
Fig. 4.
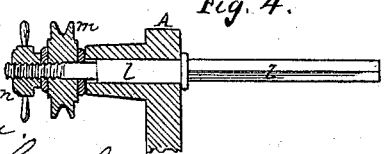
Witnesses.
C. B. Nottingham
Thomas C. Smith
Inventor.
Thomas J. Mayall
by atty A. Houck

UNITED STATES PATENT OFFICE.

THOMAS J. MAYALL, OF BOSTON, MASSACHUSETTS.

IMPROVEMENT IN MACHINES FOR CUTTING INDIA-RUBBER SHEETS INTO BANDS FOR HOSE AND BELTING.

Specification forming part of Letters Patent No. 125,597, dated April 9, 1872.

*To whom it may concern:*

Be it known that I, THOMAS J. MAYALL, of Boston, Suffolk county, Massachusetts, have invented certain new and useful Improvements in Machinery for Cutting Sheets of India Rubber into Strips or Bands for the Manufacture of Belting, Hose, and other articles, of which the following is a specification:

My invention is intended to perform by machinery a work which, in India-rubber manufacture, has hitherto been done by hand. The work referred to consists in cutting up and separating into strips or bands sheets of India rubber composed either wholly of vulcanizable India rubber or rubber compound, or of canvas or other textile coated with rubber, said strips or bands being designed for the manufacture of belting, hose, or other articles of vulcanized India rubber.

The rubber being, in the green or plastic state, requires to be carefully manipulated, in order to prevent the different strips or bands, or the folds of any strip or band, when rolled up, from sticking together. On account of the great length which the strips often have it is quite necessary to form them into rolls for convenience of handling, and this can only be done by interposing between the several folds of each roll a lining, which will remove them from direct contact with one another.

In the machine which I have devised I have therefore made provision not only for cutting the sheet into smaller bands, but also for forming the bands into rolls, with a lining interposed between the several folds of each roll.

The nature of my invention will be readily understood by reference to the accompanying drawing, in which—

Figure 1 is a side elevation of a machine made in accordance with my invention. Fig. 2 is a plan of the same. Figs. 3 and 4 are views of detached parts, which will be referred to.

The various parts of the machine are carried in and by a frame, A, of suitable size and shape, made of cast metal or other material.

I shall describe first the cutting mechanism proper and then the device for rolling up the cut bands or strips.

The cutting-knives I prefer to use are shown at $a$. They consist, each of a circular steel plate with a beveled periphery, so as to form a sharp cutting-edge, the face of the plate on the side where the cutting edge is located being slightly concave. The cutters are mounted upon a shaft, B, supported in suitable bearings in frame A. The cutters are detachable from the shaft, so that any required number may be used, and they are so arranged as to be set at various distances apart, according to the width of band desired.

I employ two sets of cutters and two shafts, B C, the one shaft arranged directly under the other, and the cutters on this lower shaft are arranged so that their cutting-edges will be contiguous to and partly overlap the cutting-edges of the corresponding cutters on the upper shaft; the two contiguous edges, when rotating, acting like shears, as is usual with this kind of cutting mechanism. The shafts are geared together by gears D E, the latter deriving its movement from the large toothed wheel F, which meshes into a gear on the main shaft G.

Between the cutters are placed removable split tubes $b$, of vulcanized India rubber, which are of different lengths, to correspond with the distances between the cutters, and can be readily snapped or sprung onto the shaft. These rubber tubes are quite essential to the operation of the cutters, as they take hold of and support the sheet under the action of the cutters.

The prepared rubber sheet $e$ passes to the cutters, over a divergingly-grooved roller, $c$, from the spindle $d$ upon which it has been previously wound. The rubber sheet, being in the green or plastic state, is wrapped up with a lining, $f$, usually of cambric, which prevents its folds from sticking together. In order to take up and remove out of the way the lining, which is unwound along with the rubber sheet, I provide a roller or spindle, $g$, upon which the lining is wound in proportion as it is unwound from the main roller or spindle $d$. The roller $g$ receives its motion by means of a cross-belt, $g'$, from the main-shaft G, and is revolved in such direction as to effect the winding up of the lining.

The outer end of the rubber sheet is, in the first instance, led by hand to the cutters, and the outer ends of the lining is secured to the spindle $g$, and then, when the machine is put in motion, in proportion as the rubber sheet passes to the cutters the lining is separated from it and wrapped upon the spindle $g$.

To allow the removal of the spindles $d$ and $g$ their square ends fit in corresponding square or rectangular open slots $h$ formed in bearings H (see Fig. 3) mounted in the frame of the machine so as to be capable of rotating, in which slots they are held by rings $i$ arranged to slide or slip over the slots so as to retain in place the ends of the spindles. When the spindles are to be removed the rings can be slipped back, and the spindles may be lifted out.

The spindle $d$ has no positive movement of its own, but the rubber sheet is unwound from it by means of drawing-rolls I, placed beyond or on the other side of the cutters, as shown in Fig. 1. These rolls I prefer to make of vulcanized rubber, and one of them (the upper one in this instance) is supported in sliding bearings, held down toward the lower roller by means of springs, whereby yielding pressure is maintained between the two rollers. They are geared together by gears $I'$ $I'$, the lower one engaging with and deriving its movement from the large toothed wheel F.

The rubber sheet, by the time it has arrived at the drawing-rolls, is divided into a number of bands or strips; and these bands or strips, after passing through the drawing-rollers, require to be wound up into rolls. But, owing to the rubber being in the green state, each band must have a lining to prevent the folds from sticking together.

To provide for this I make use of spindles, which are arranged to extend from the side of the machine in the path of the bands of the requisite length, and so placed with relation to each other as not to cause the bands to interfere when traveling to and being wrapped around their respective spindles. For each band I employ a pair of spindles, one carrying the lining and the other designed to receive the band as it passes from the drawing-rolls and the lining from the first spindle, both lining and rubber being wound together around the second spindle.

This arrangement is plainly represented in the drawing. The rubber sheet is divided, as there shown, into four strips or bands, 1, 2, 3, 4. Two spindles, 5, 6, are provided for the first band; two, 7, 8, for the second band; two, 9, 10, for the third band; and two, 11, 12, for the fourth band. The spindles 5, 7, 9, 11 are the lining-spindles; the others receive the bands, together with the linings drawn from the lining-spindles.

The band-spindles are revolved in the proper direction to effect the winding up of the bands by means of pulleys $m$ connected by belting with a drum, K, which is revolved by gearing $k$ $k'$ from the main shaft G.

The wrapping of the band 1 upon its spindle 6 is effected by securing upon the spindle both the end of the band and also the end of the lining from spindle 5. If the machine be now put in motion the rubber band, as it passes from the drawing-rolls, will be wound upon its spindle, which also draws from the lining-spindle 5 the cambric or other lining material required. Thus, both lining and rubber band are wound upon the spindle 6. The operation of the other pairs of spindles is similar to that of the pair just described.

The spindles are mounted on and removable from rods $l$. That part of these rods on which the spindles fit has a square or angular section, and the spindles have correspondingly-shaped sockets, so that the two will revolve together. The rods have suitable bearings in the frame A, and the rods of the band-spindles are revolved by means of the pulleys $m$ above named. These pulleys (see Fig. 4) are loose on the stems of the rods, and are clamped more or less tightly against shoulders on said rods by means of nuts $n$ screwed onto the ends of the rods.

The object of this arrangement is to regulate the action of the pulleys. They will, of course, need to revolve faster when the bands are just commencing to be wound upon the spindles than when large rolls of banding have accumulated on the spindles, and, therefore, the nuts are so adjusted as to permit the pulleys to slip on the spindles without turning them any more rapidly than is required in order to take up the rubber bands as they pass from the drawing-rolls.

There are no pulleys on the rods of the lining-spindles, but they also have clamp-nuts to produce a resistance to the movement of the spindles sufficient to prevent them from giving out more lining than is needed.

When the whole of the piece or sheet has been cut up, or when the band-spindles have received sufficient banding, they may be slipped off from their rods $l$ and removed from the machine.

The machinery or apparatus above described is designed with more special reference to the cutting up of canvas or duck coated with rubber, and intended to be used for making belting or hose; but it can be used in any case where it is desired to cut rubber sheets of any kind into bands or smaller strips.

I do not limit myself to the precise arrangement of parts herein described, as the same may be varied in many respects without departing from the principle of my invention.

What I claim, and desire to secure by Letters Patent, is—

1. Machinery for cutting up India-rubber sheets into bands or strips and forming the same into rolls, organized and operating substantially as shown and described.

2. The combination, with the cutting mechanism and drawing-rolls, of the lining and band spindles, under the arrangement described, whereby each band, as it passes from the drawing-rolls, is, together with its lining, formed into a roll, substantially as set forth.

3. The lining and band spindles, arranged and operating together, as herein shown and described.

4. In combination with the band and lining spindles, the means, substantially as herein described, for permitting the rotation of the same to vary, in accordance with the increase or decrease in the diameter of the rolls of banding.

In testimony whereof I have signed my name to this specification before two subscribing witnesses.

THOS. J. MAYALL.

Witnesses:
   EDM. F. BROWN,
   C. B. NOTTINGHAM.